United States Patent [19]
Itzinger et al.

[11] Patent Number: 4,609,082
[45] Date of Patent: Sep. 2, 1986

[54] DOUBLE-TUBE VIBRATION DAMPER UNIT

[75] Inventors: Hermann Itzinger, Dittelbrunn; Werner Christel, Hambach, both of Fed. Rep. of Germany

[73] Assignee: Fichtel & Sachs AG, Schweinfurt, Fed. Rep. of Germany

[21] Appl. No.: 622,535

[22] Filed: Jun. 20, 1984

[30] Foreign Application Priority Data

Jun. 22, 1983 [DE] Fed. Rep. of Germany ....... 3322366

[51] Int. Cl.$^4$ ................................................. F16F 9/40
[52] U.S. Cl. ..................................... 188/315; 188/318
[58] Field of Search ................. 188/315, 318, 322.12, 188/322.16, 322.17, 322.18

[56] References Cited

U.S. PATENT DOCUMENTS 4,238,009 12/1980 Wössner et al. ..................... 188/315

FOREIGN PATENT DOCUMENTS

| 1146705 | 10/1963 | Fed. Rep. of Germany . |
| 1292014 | 4/1969 | Fed. Rep. of Germany ...... 188/315 |
| 2948391 | 6/1981 | Fed. Rep. of Germany . |
| 576025 | 3/1946 | United Kingdom . |
| 663600 | 12/1951 | United Kingdom . |
| 924478 | 4/1963 | United Kingdom . |
| 1290948 | 9/1972 | United Kingdom . |
| 2013826 | 8/1979 | United Kingdom . |
| 2125930 | 3/1984 | United Kingdom . |

Primary Examiner—Bruce H. Stoner, Jr.
Assistant Examiner—Richard R. Diefendorf
Attorney, Agent, or Firm—Toren, McGeady, Stanger, Goldberg & Kiel

[57] ABSTRACT

In a double-tube vibration damper the cylinder engages by a terminal edge thereof an engagement face of a piston rod guiding and sealing unit. When the piston rod moves in the outward direction with respect to the cylinder, a high pressure occurs in the working chamber adjacent the piston rod guiding and sealing unit. Due to this high pressure damping liquid jets may escape between the terminal edge of the cylinder and the engagement face of the piston rod guiding and sealing unit. These liquid jets may cause foaming within the annular space defined between the cylinder and a container surrounding the cylinder. In view of avoiding such foaming, an annular cover member is provided between the cylinder and the container, which annular cover member prevents the direct entrance of liquid jets into the annular space between the cylinder and the container. This annular cover member is situated such that it extends across the plane of engagement defined by the terminal edge of the cylinder and extends perpendicular with respect to the axis of the cylinder.

16 Claims, 3 Drawing Figures

DOUBLE-TUBE VIBRATION DAMPER UNIT

BACKGROUND OF THE INVENTION

This invention relates to a double-tube vibration damper unit such as for vehicles. The invention concerns particularly the problem of preventing foaming of the liquid and gas within the annular space between the cylinder and the container due to liquid jets entering from the cavity within the cylinder into the annular space in response to high pressure occurring within the cavity.

STATEMENT OF THE PRIOR ART

German Pat. No. 1,146,705 shows a double-tube vibration damper of the type as considered by the present invention. In the known vibration damper an annular member of L-shaped configuration is provided at the location of engagement between a terminal edge of the cylinder member and an engagement face of the piston rod guiding and sealing unit. One flange of the L-shaped configuration is located in the plane defined by the terminal edge of the cylinder member and the other flange extends in the axial direction of the cylinder member on one side of the first flange. On said one side of the first flange no liquid jets can directly enter into the annular space between the cylinder member and the container. On the other side of the first flange, however, liquid jets can pass from the cavity within the cylinder member into the annular space between the cylinder member and the container surrounding the cylinder member when high pressure occurs within the cylinder member. These liquid jets can cause a foaming condition within the annular space, which is partially filled with damping liquid and partially filled with gas.

It is further known from German Offenlegungsschrift No. 2,948,391 to provide in a double-tube vibration damper of the type considered by the present invention a high engagement force between the terminal edge of the cylinder member and the engagement face of the piston rod guiding and sealing unit. However, even under such high engagement force the sealing action is not always sufficient in view of avoiding liquid jets entering into the annular space. Therefore, foaming is not always avoided in this known construction.

It is further known to provide sealing members, e.g. soft iron sealing members between the terminal edge of the cylinder member and the engagement face of the piston rod guiding and sealing unit. It has been found, however, that even such sealing members cannot completely avoid the occurrence of fine liquid jets entering from the cavity within the cylinder member into the annular space surrounding the cylinder member.

The occurrence of foaming within the annular space between the cylinder member and the container member is highly undesirable, because such foaming can result in reduced damping action of the double-tube vibration damper during the pressure stroke, i.e. when the piston rod member moves inwardly with respect to the cylinder member.

In view of the very high pressure occurring within double-tube vibration dampers, as considered by the present invention, it is nearly impossible to prevent the occurrence of liquid jets directed into the annular space between the cylinder member and the container member by sealing techniques.

OBJECT OF THE INVENTION

It is an object of the present invention to provide a double-tube vibration damper unit, in which the undesirable results of liquid jets entering into the annular cavity between a cylinder member and a container member surrounding the cylinder member are avoided, even if such liquid jets per se are inavoidable.

SUMMARY OF THE INVENTION

A vibration damper unit such as for vehicles comprises a cylinder member having an axis and two ends, namely a first end and a second end and is provided with a bottom valve unit adjacent the second end and a piston rod guiding and sealing unit adjacent the first end. A cavity is defined within the cylinder member between the bottom valve unit and the piston rod guiding and sealing unit. The first end of the cylinder member has a terminal edge engaging an engagement face supported by the piston rod guiding and sealing unit. This terminal edge and this engagement face are substantially located within a plane of engagement perpendicular to the axis of the cylinder member. A piston rod member extends through the guiding and sealing unit along the axis of the cylinder member and is axially movable with respect to the cylinder member. A piston unit is fastened to the piston rod member within the cavity and divides the cavity into two working chambers, namely a first working chamber adjacent the piston rod guiding and sealing unit and a second working chamber adjacent the bottom valve unit. These working chambers are interconnected for fluid exchange by throttled piston passage means extending across the piston unit. A container member surrounds the cylinder member and has a first end adjacent said first end of the cylinder member and a second end adjacent the second end of the cylinder member. The container member is closed adjacent the second end by an end wall and adjacent the first end by the piston rod guiding and sealing unit. An annular space is defined between the cylinder member and the container member. This annular space is interconnected with the second working chamber for fluid exchange through throttled bottom passage means extending across the bottom valve unit. A body of damping liquid is contained within the cavity. A body of damping liquid and a body of gas are contained within the annular space.

In view of the above defined object of the invention an annular cover member is provided between the cylinder member and the container member and extends in axial direction across the plane of engagement.

The invention does not intend to prevent liquid jets entering into the annular space under all circumstances, but nevertheless avoids the detrimental effect of such liquid jets entering into the annular space which contains both liquid and gas. Therefore, according to this invention the very expensive efforts can be avoided which have been made in the past for providing a reliable high pressure sealing action between the edge of the cylinder member and the engagement face of the piston rod guiding and sealing unit.

According to the invention, liquid jets do not directly enter into the annular space defined between the cylinder member and the container member, but enter first of all necessarily into the annular chamber defined by the annular cover member and the cylinder member. In this annular chamber a slow pressure decrease of the dynamic pressure of the liquid jets can occur. It has been found by experiments that a foaming is avoided even if liquid jets enter into the annular chamber.

According to a further aspect of this invention it is desired that a certain pressure is maintained within the annular chamber defined between the annular cover member and the cylinder member. In view of maintaining such a pressure exceeding the pressure within the remainder of the annular space defined between the cylinder member and the container member, it is desirable that the passages interconnecting the annular chamber and the annular space have a very small cross-sectional area. Assuming that the annular chamber is substantially closed at one end thereof and an annular gap is provided at the other end thereof, this annular gap should have a radial width of less than 0.2 mm or less than 0.01 inch.

The various features of novelty which characterize the invention are pointed out with particularity in the claims annexted to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
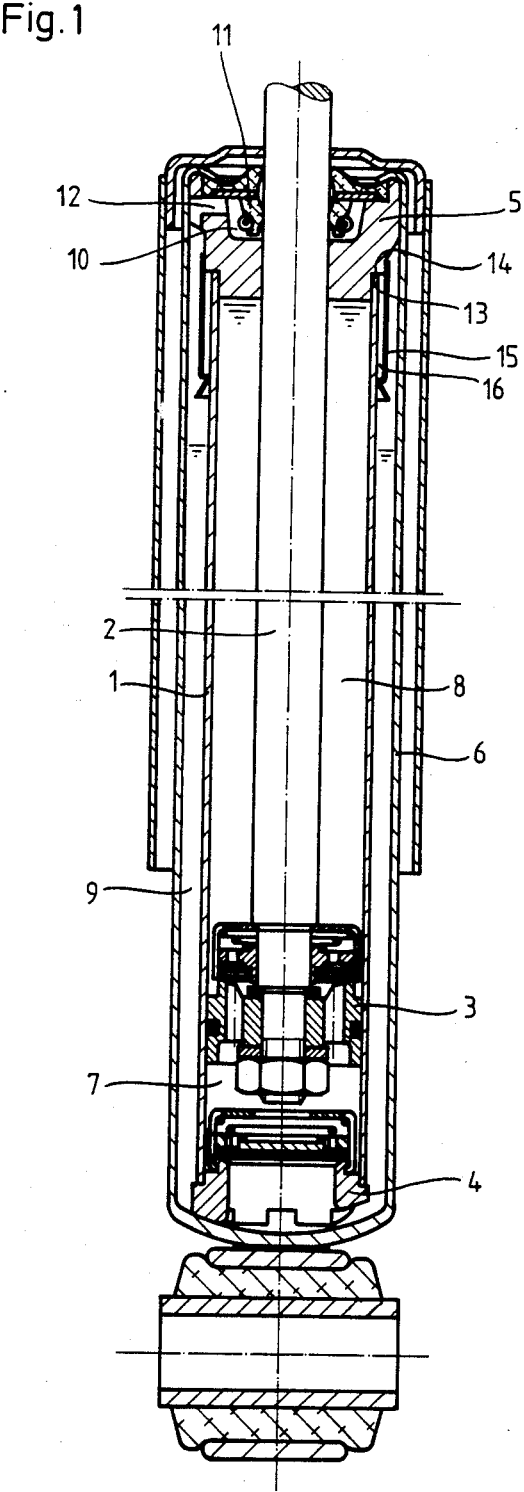
FIG. 1 shows a longitudinal section of the double-tube vibration damper of this invention.

The double-tube vibration damper according to FIG. 1 consists of the cylinder tube 1 in which a piston 3 connected with a piston rod 2 and carrying damping valves is axially displaceably arranged. The cylinder 1 engages with one end in the bottom valve unit 4 and with the other end in the piston rod guiding and sealing unit 5 and is under axial compression within the container 6 after closure of the container by curling the upper edge of the container wall around the upper edge of the unit 5. The cavity of the cylinder 1 is divided by the piston 3 into the lower (second) working chamber 7 and the upper (first) working chamber 8 and these working chambers are filled with damping liquid. The partially gas-filled and partially liquid-filled annular space 9 acting as a compensation chamber is in communication through the bottom valve unit 4 with the lower working chamber 7. In the piston rod guiding and sealing unit 5 there is provided a sealing chamber 10, into which a piston rod sealing member 11 extends at least with a part of its axial length. This sealing chamber 10 is in communication with the compensation chamber 9 through at least one passage 12. The upper edge 13 of the cylinder 1 is pressed against the engagement face 14 of the piston rod guiding and sealing unit 5, while an annular cover member 15 in cooperation with the external face of the cylinder 1 forms an annular chamber 16.

In assembling the vibration damper an axially downwardly directed force is applied to the unit 5 which is transmitted through the cylinder member 1 and the bottom valve unit 4 to the bottom of the container 6, and the cylinder member 1 is axially compressed. The upper end of the container member is radially inwardly bent over the upper end of the piston rod guiding and sealing unit 5 as long as the radial compression of the cylinder member 1 is maintained. If, after the inward bending member of the upper end portion of the container member 6 the axial compression of the cylinder member 1 is released, the cylinder member 1 expands in axial direction then a part of the axial compressive prestress of the cylinder member 1 is transformed into a tensional stress of the container 6.

Figure 2:
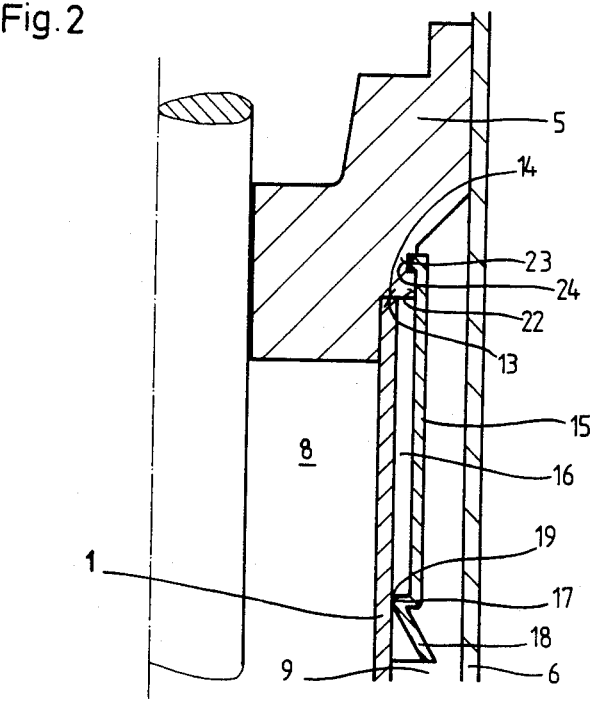
FIG. 2 shows a detail of the longitudinal section of FIG. 1 in the area of the annular cover member.

As shown in FIG. 2, the annular cover member 15 extends across the engagement face 14. A constriction surrounds the external face of the cylinder 1 and forms an annular gap 19 with the external surface of the cylinder 1, which gap 19 has a width less than 0.2 mm. As jointing aid for assembling the cylinder 1 and the unit 5, the annular cover member 15 has a conically downwardly widening extension piece 18. At its upper end the cover member 15 lies on the cylindrical surface 22 of the unit 5. For axial fixing on the unit 5 the cover member 15 is provided with at least one inwardly directed projection 23 which engages by snapping action in a corresponding recess 24 of the unit 5. This recess 24 of the unit 5 is formed in a simple manner by a circumferential groove.

Since the manner of operation of a double-tube vibration damper is adequately known, only the arrangement for the prevention of foaming will be discussed below. In the extension stroke, that is when the piston rod 2 emerges upwards from the cylinder 1, a great pressure rise in the damping liquid takes place in the upper working chamber 8. This has the effect that through the gap between the piston rod 2 and the unit 5 damping liquid is forced out from the working chamber 8 into the sealing chamber 10 and enters the oil sump present there. Thence this damping fluid flows away through the passages 12 into the compensation chamber 9. As a result of high pressure in the working chamber 8, damping liquid flows at high speed between the end face or edge 13 of the cylinder 1 and the engagement face 14 of the unit 5 into the chamber 16 formed by the cylinder and the annular cover member 15. As a result of the narrow gap 19 between the constriction 17 adapted to the external diameter of the cylinder 1 and the cylinder 1, the damping liquid cannot flow away immediately into the compensation chamber 9, but forms a kind of oil reserve in the chamber 16. Although in the form of embodiment as illustrated in FIGS. 1 and 2 the conical extension piece 18 of the cover member 15 enters the gas space above the liquid level of the compensation chamber 9, the pressure reduction of the oil jets issuing between the edge 13 and the abutment face 14 is retarded by the cover member 15 in such a way that foaming is avoided.

Figure 3:
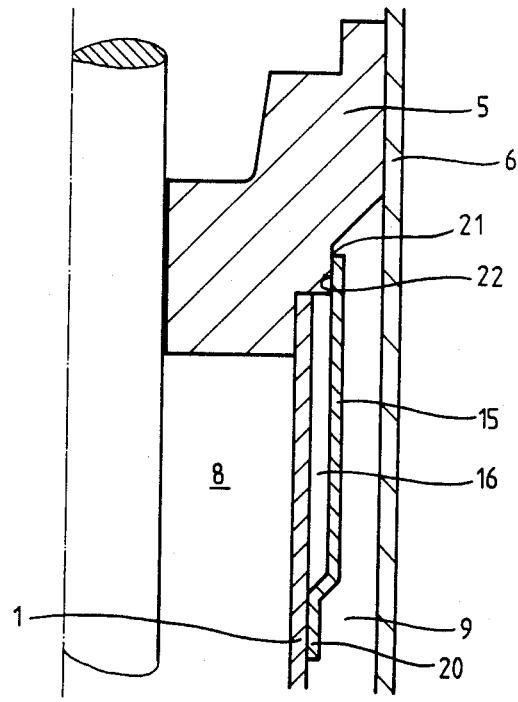
FIG. 3 shows a second embodiment of the invention in a longitudinal section similar to FIG. 2.

The form of embodiment according to FIG. 3 differs from that according to FIGS. 1 and 2 essentially in that the cover member 15 is provided with an extension 20 of reduced diameter and secured therewith on the external surface of the cylinder 1. The internal diameter of the cover member 15 forms an annular gap 21 with the cylindrical surface 22 of the unit 5. The oil sump present in the chamber 16 cannot discharge downwards into the compensation chamber 9, so that the damping liquid issuing between the cylinder 1 and the unit 5 from the working chamber 8 flows constantly into the oil-filled chamber 16 and thence, through the annular gap 21, with pressure reduction, into the compensation chamber 9 situated between the cylinder 1 and the container 6.

While specific embodiments of the invention have been shown and described in detail to illustrate the application of the inventive principles, it will be understood that the invention may be embodied otherwise without departing from such principles.

It is to be noted that the reference numerals in the claims are only provided in view of facilitating the understanding of the claims. These reference numerals are by no means to be understood as restrictive.

What is claimed is:

1. In a vibration damper unit such as for vehicles comprising a cylinder member (1) having an axis and two ends, namely a first end and a second end and being provided with a bottom valve unit (4) adjacent said second end and a piston rod guiding and sealing unit (5) adjacent said first end, a cavity (7, 8) being defined within said cylinder member (1) axially between said bottom valve unit (4) and said piston rod guiding and sealing unit (5), said first end of said cylinder member (1) having a terminal edge (13) engaging an engagement face (14) supported by said piston rod guiding and sealing unit (5), said terminal edge (13) and said engagement face (14) being substantially located within a plane of engagement perpendicular to said axis;

a piston rod member (2) extending through said guiding and sealing unit (5) along said axis and being axially movable with respect to said cylinder member (1);

a piston unit (3) fastened to said piston rod member (2) within said cavity (7, 8) and dividing said cavity into two working chambers (7, 8) namely a first working chamber (8) adjacent said piston rod guiding and sealing unit (5) and a second working chamber (7) adjacent said bottom valve unit (4), said working chambers (7, 8) being interconnected for fluid exchange by throttled piston passage means extending across said piston unit (3);

a container member (6) surrounding said cylinder member (1) and having a first end adjacent said first end of said cylinder member (1) and a second end adjacent said second end of said cylinder member, said container member (6) being closed adacent said second end by an end wall and adjacent said first end by said piston rod guiding and sealing unit (5), an annular space (9) being defined between said cylinder member (1) and said container member (6), said annular space (9) being interconnected with said second working chamber (7) for fluid exchange through throttled bottom passage means extending across said bottom valve unit (4);

body damping liquid within said cavity (7, 8);

a body of damping liquid and a body of gas within said annular space (9);

an annular cover member (15) being provided radially between said cylinder member (1) and said container member (6) and extending in axial direction across said plane of engagement;

said annular cover member (15) being fixed by one end thereof to said piston rod guiding and sealing unit (5) and having a free end;

an annular interspace (16) being defined between said annular cover member (15) and said cylinder member (1);

said cover member (15) being constricted (at 17) near the free end thereof such as to form a circumferentially continuous annular gap (19) of reduced radial width as compared with the radial width of said annular interspace (16);

said plane of engagement being located axially between said one end and said free end.

2. A vibration damper unit as set forth in claim 1, wherein said gap (19) having a width in radial direction which is smaller than 0.2 mm.

3. A vibration damper unit as set forth in claim 1, wherein said annular cover member (15) being further provided with a substantially conically diverging terminal extension extending beyond said gap (19) away from said one end.

4. A vibration damper unit as set forth in claim 1, wherein said body of damping liquid and said body of gas within said annular space (9) defining an interface, said free end of said cover member (15) being located within said body of gas and remote from said interface.

5. A vibration damper unit as set forth in claim 1, wherein said annular cover member (15) being plastics-made.

6. A vibration damper unit as set forth in claim 1, wherein said terminal edge (13) engaging said engagment face (14) with an axial force resulting from a compressive prestress of said cylinder member (1) between said end wall and said piston rod guiding and sealing unit (5), said prestress being maintained by tensional stress in said container member (6).

7. A vibration damper unit as set forth in claim 1, wherein said first working chamber (8) being in throttled fluid communication with a sealing chamber (10) with said piston rod guiding and sealing unit (5), said sealing chamber (10) being in fluid communication with said annular space (9).

8. A vibration damper unit as set forth in claim 1, wherein said annular cover member (15) being preassembled with said cylinder member (1) by a snapping action.

9. In a vibration damper unit such as for vehicles comprising a cylinder member (1) having an axis and two ends, namely a first end and a second end and being provided with a bottom valve unit (4) adjacent said second and a piston rod guiding and sealing unit (5) adjacent said first end, a cavity (7, 8) being defined within said cylinder member (1) axially between said bottom valve unit (4) and said piston rod guiding and sealing unit (5), said first end of said cylinder member (1) having a terminal edge (13) engaging an engagement face (14) supported by said piston rod guiding and sealing unit (5), said terminal edge (13) and said engagement face (14) being substantially located within a plane of engagement perpendicular to said axis;

a piston rod member (2) extending through said guiding and sealing unit (5) along said axis and being axially movable with respect to said cylinder member (1);

a piston unit (3) fastened to said piston rod member (2) within said cavity (7, 8) and dividing said cavity into two working chambers (7, 8), namely a first working chamber (8) adjacent said piston rod guiding and sealing unit (5) and a second working chamber (7) adjacent said bottom valve unit (4), said working chambers (7, 8) being interconnected for fluid exchange by throttled piston passage means extending across said piston unit (3);

a container member (6) surrounding said cylinder member (1) and having a first end adjacent said first end of said cylinder member (1) and a second end adjacent said second end of said cylinder member, said container member (6) being closed adjacent said second end by an end wall and adjacent said first end by said piston rod guiding and sealing unit (5), and annular space (9) being defined between said cylinder member (1) and said container member (6), said annular space (9) being interconnected with said second working chamber (7) for fluid exchange through throttled bottom passage means extending across said bottom valve unit (4);

a body of damping liquid within said cavity (7, 8);

a body of damping liquid and a body of gas within said annular space (9);

an annular cover member (15) being provided radially between said cylinder member (1) and said container member (6) and extending in axial direction across said plane of engagement;

said annular cover member (15) defining an annular interspce (16) with said cylinder memeber (1);

said cover member (15) having a first end portion (20) nearer to said second end and being constricted such as to engage said cylinger member (1) and to close said interspace (16) and a second end portion defining a substantially axially extending annular gap (21) together with a cylindrical face (22) of said piston rod guiding and sealing unit (5);

said cylindrical face (22) having a diameter larger than the outer diameter of said cylinder member (1) such that said annular gap has a reduced radial width as compared with the radial width of said interspace (16);

said plane of engagement being located axially intermediate between said first end portion (20) and said second end portion.

10. A vibration damper unit as set forth in claim 9, wherein said substantially axially extending annular gap (21) having a width in radial direction which is smaller than 0.2 mm.

11. A vibration damper unit as set forth in claim 9, wherein said annular cover member (15) being provided with at least one radially inwardly directed projection (23) at said second end portion thereof, said radially inwardly directed projection (23) engaging a corresponding recess (24) of said piston rod guiding and sealing unit (5).

12. A vibration damper unit as set forth in claim 9, wherein said annular cover member (15) being plastic-made.

13. A vibration damper unit as set forth in claim 9, wherein said terminal edge (13) engaging said engagement face (14) with an axial force resulting from a compressive prestress of said cylinder member (1) between said end wall and said piston rod guiding and sealing unit (5), said prestress being maintained by tensional stress in said container member (6).

14. A vibration damper unit as set forth in claim 9, wherein said first working chamber (8) being in throttled fluid communication with a sealing chamber (10) with said piston rod guiding and sealing unit (5), said sealing chamber (10) being in fluid communication with said annular space (9).

15. A vibration damper unit as set forth in claim 9, wherein said annular cover member (15) being preassembled with said piston rod guiding and sealing unit (5) by a snapping action.

16. A vibration damper unit as set forth in claim 9, wherein said cover member (15) being completely closed between said first end portion and said second end portion.

* * * * *